us008549163B2

United States Patent
Urdan et al.

(10) Patent No.: US 8,549,163 B2
(45) Date of Patent: Oct. 1, 2013

(54) PASSIVE PARAMETER BASED DEMOGRAPHICS GENERATION

(76) Inventors: Jonathan M. Urdan, Los Angeles, CA (US); John L. Williams, Riverton, CT (US)

(*) Notice: Subject to any disclaimer, the term of this patent is extended or adjusted under 35 U.S.C. 154(b) by 389 days.

(21) Appl. No.: 12/233,411

(22) Filed: Sep. 18, 2008

(65) Prior Publication Data

US 2010/0070621 A1    Mar. 18, 2010

(51) Int. Cl.
  *G06F 15/16* (2006.01)
(52) U.S. Cl.
  USPC .............. 709/231; 709/223; 709/224
(58) Field of Classification Search
  USPC .......................... 709/231, 223–224
  See application file for complete search history.

(56) References Cited

U.S. PATENT DOCUMENTS

| | | | |
|---|---|---|---|
| 6,009,410 A | 12/1999 | LeMode et al. | |
| 6,285,987 B1 | 9/2001 | Roth et al. | |
| 6,453,302 B1 | 9/2002 | Johnson et al. | |
| 6,792,458 B1* | 9/2004 | Muret et al. | 709/224 |
| 6,990,630 B2* | 1/2006 | Landsman et al. | 715/205 |
| 7,181,415 B2 | 2/2007 | Blaser et al. | |
| 7,194,424 B2 | 3/2007 | Greer et al. | |
| 7,240,022 B1 | 7/2007 | Bristriceann et al. | |
| 7,243,129 B1* | 7/2007 | Thomas | 709/207 |
| 7,260,837 B2 | 8/2007 | Abraham et al. | |
| 7,313,622 B2 | 12/2007 | Lee et al. | |
| 7,324,953 B1 | 1/2008 | Murphy | |
| 7,331,057 B2 | 2/2008 | Eldering et al. | |
| 7,337,127 B1 | 2/2008 | Smith et al. | |
| 7,580,848 B2* | 8/2009 | Eder | 705/7.11 |
| 7,630,986 B1* | 12/2009 | Herz et al. | 1/1 |
| 7,690,013 B1* | 3/2010 | Eldering et al. | 725/36 |
| 7,747,680 B2* | 6/2010 | Ravikumar et al. | 709/203 |
| 2003/0105694 A1* | 6/2003 | Conkwright et al. | 705/35 |
| 2004/0199584 A1* | 10/2004 | Kirshenbaum et al. | 709/205 |
| 2004/0244029 A1* | 12/2004 | Gross | 725/9 |
| 2005/0165889 A1* | 7/2005 | Muret et al. | 709/203 |
| 2007/0027761 A1 | 2/2007 | Collins et al. | |
| 2007/0180469 A1* | 8/2007 | Finley et al. | 725/46 |
| 2008/0028066 A1* | 1/2008 | Berkhin et al. | 709/224 |
| 2008/0046923 A1* | 2/2008 | Enderwick | 725/35 |
| 2008/0059297 A1* | 3/2008 | Vallier et al. | 705/14 |
| 2008/0097832 A1* | 4/2008 | Lee et al. | 705/10 |
| 2008/0189408 A1* | 8/2008 | Cancel et al. | 709/224 |
| 2008/0199042 A1* | 8/2008 | Smith | 382/100 |
| 2008/0209024 A1* | 8/2008 | Shapira et al. | 709/223 |
| 2008/0249987 A1* | 10/2008 | Ogasawara | 707/3 |
| 2008/0294681 A1* | 11/2008 | Rosato et al. | 707/102 |
| 2009/0037253 A1* | 2/2009 | Davidow et al. | 705/10 |
| 2009/0193097 A1* | 7/2009 | Gassewitz et al. | 709/218 |
| 2009/0300031 A1* | 12/2009 | Lejano et al. | 707/100 |

* cited by examiner

Primary Examiner — Waseem Ashraf

(57) ABSTRACT

A method for characterizing website visitors based on visitor passive parameters and using the characterization to select and/or market website content. The passive visitor parameters include data in the browser agent, time of a website visit, IP address, etc. Such visitor passive parameters are available each time a visitor visits a website. In a first step, a first embodiment of the method anonymously compares the visitor passive parameters with known demographics, for example, at financial websites, to create a statistical mapping between the visitor passive parameters and the demographics. In a second step, the mapping is used to estimate demographics data for future website visitors and then site content provided to the future website visitors is based on the estimated demographics.

6 Claims, 6 Drawing Sheets

PASSIVE PARAMETER BASED DEMOGRAPHICS GENERATION

BACKGROUND OF THE INVENTION

The present invention relates in general to online Internet advertising optimization, and more specifically to analysis of relationships between web browser agent data and characteristics and behavior of website visitors.

There are many advertising systems and methods which are used to select advertisements for display on Internet websites. These advertising systems use various strategies and logic to select which products and/or services may be of interest to an individual website visitor and how advertisements for the selected products should appear within a website. There are many competing ideas and many different approaches to designing the logic which is used to select and display the advertising.

One such strategy is based on data which is collected for each website visitor. In this strategy, a unique identifier (commonly, an Internet browser cookie) is downloaded from the website to the visitors computer. This unique identifier allows the advertising system to tag the visitor and recognize the visitor's visits to the website as a discrete individual. Further, data observed during the visit to the website is collected and stored in a data base and indexed to the unique identifier. This allows the advertising network to cross reference the stored data about the visitor in the database each time the visitors computer requests a web page. Observing a visitor's habits allows the advertising network to better determine which ads to display based on the stored data. A website may also retrieve visitor preferences and interests stored at the website by identifying a returning visitor. The different kinds of data which may be gathered and the means of referencing the data based on the users identifier are important aspects of the strategy.

One common way to gather visitor interests is to observe the visitor's path through the website and noting the topics of the pages which the visitor views. Another way to gather data is to request that the visitor fill out a survey and then store the survey information for future use by the advertising system when the visitor returns. A third common way to gather this data is by saving information supplied by the visitor when purchasing goods. Oftentimes, the billing address given at the conclusion of an e-commerce transaction can be used to purchase demographic data from companies which compile such information on a wide basis. Thus, there are several existing approaches to collecting and referencing data for online advertising systems.

There are several concerns and problems with known methods of data collection and indexing. One overarching issue is that the visitor's privacy is threatened by the combined data gathering. Another potential issue is that the cookie used to store the visitor's unique identifier resides on the visitor's computer system. Visitors often delete these cookies and thereby defeat the ability to recognize repeat visits. In addition, due to privacy concerns, a market has developed for software applications which remove cookies placed by advertising systems. The result of removing the unique identifying cookie is that the advertising network can no longer reference information stored in the database for that visitor, and may incorrectly identify future visits by the same visitor as an additional visitor.

BRIEF SUMMARY OF THE INVENTION

The present invention addresses the above and other needs by providing a method for characterizing website visitors based on visitor passive parameters and using the characterization to select and/or market website content. The passive visitor passive parameters include data in the browser agent, time of a website visit, IP address, etc. Such visitor passive parameters are available each time a visitor visits a website. In a first step, a first embodiment of the method anonymously compares the visitor passive parameters with known demographics, for example, at financial websites, to create a statistical mapping between the visitor passive parameters and the demographics. In a second step, the mapping is used to estimate demographics data for future website visitors and then site content provided to the future website visitors is based on the estimated demographics.

The present invention further uses browser agent data to predict the characteristics of website visitors. First, data about the characteristics of website visitors (including, but not limited to, demographics information as well as specific behavioral information) is matched statistically to user agent strings. Then, the user agent strings are used to predict the characteristics of future visitors to a website. The use of the present user agent data for these purposes facilitates the other unique aspects of the invention described in the following.

The combination of the browser agent string and statistical analysis of the present invention has several unique benefits not present in known methods of predicting user characteristics or behavior. These benefits are:

(1) The browser agent string is always present, unlike browser cookies which may be removed and cleared;

(2) Emerging internet platforms and devices (e.g. cellular phones, video game consoles) do not have the capability to store browser cookies at all, while browser agents are still enabled and used;

(3) Similarly, certain applications which are becoming increasingly common, such as videos and Adobe Flash, do not support existing website visitor tracking technologies, but could be analyzed using methods according to the present invention;

(4) The methods according to the present invention completely protect website visitor privacy because individual website visitors are never identified during the statistical mapping phase, and the browser agents do not identify the website visitors; and (5) Because the browser agent is stored in log files of existing web servers, the data may be post-analyzed without modifying the technical infrastructure of the website.

(6) The methods of applying statistical techniques to other websites' passive and active parameters provides superior insight in characterizing web visitors not available with current methods or passive parameters alone.

In accordance with one aspect of the invention, there is provided a first method for characterizing web site visitors so that online advertising can be adjusted and optimized. The first method comprises obtaining a multiplicity of anonymous first website visitor passive parameters from a first website for a multiplicity of first website visitors visiting the first website. Corresponding active parameters of the first website visitors are also obtained from the first website. Anonymous statistical mappings are generated between the first website visitor passive parameters and the corresponding first website visitor active parameters. The statistical mappings are provided to website operators, website publishers, search engine operators, and/or Internet advertisers. The website operators, website publishers, and/or Internet advertisers use the statistical mappings to improve the expected value of future website content provided to the future website visitors, based on future passive website visitor parameters of each of the future website visitors. Future website content is then provided to the future website visitors based on the expected value of the future website content. The first passive website visitor parameters are commonly available whenever a website is visited and do not identify the website visitor and the statistical mappings do not rely on any data identifying an individual website visitor. The second website visitor parameters are correlatable to a value of website content presentable to the future website visitors.

In accordance with another aspect of the invention, there is provided a method for marketing Internet advertising. The method for marketing Internet advertising includes obtaining a multiplicity of anonymous first website visitor passive parameters from a financial website for a multiplicity of financial website visitors visiting the financial website. Corresponding financial website visitor demographics of the financial website visitors are obtained, where a value of website content presentable to future website visitors is correlatable to the website visitor demographics. Statistical mappings are anonymously generated between the first passive website visitor parameters and the financial website visitor demographics of the financial website visitors, where the statistical mappings do not rely on any data identifying an individual website visitor. The statistical mappings are marketed to website publishers, Internet advertisers, and/or second website operators. The statistical mappings are used to perform at least one of identifying future website visitors having demographics desirable to the website publishers and Internet advertisers and demonstrating demographics of the second website visitors visiting second websites operated by the second website operators.

In accordance with yet another aspect of the invention, there is provided a second method for marketing Internet advertising. The second method for marketing Internet advertising includes obtaining anonymous first website visitor passive parameters from an e-commerce website for a multiplicity of e-commerce website visitors visiting the e-commerce website, where the anonymous first passive website visitor parameters are commonly available whenever a website is visited. Transaction data corresponding to the first passive website visitor passive parameters for the e-commerce website visitors is also obtained from the e-commerce website. Statistical mappings are generated from the first website visitor passive parameters to the transaction data, where the statistical mappings do not rely on any data identifying an individual website visitor. The statistical mappings are marketed to website publishers and Internet advertisers and expected values of Internet advertising to future website visitors based are estimated on future website visitor passive parameters of the future website visitors and the statistical mappings. The Internet advertising is then allocated to the future website visitors based on the expected values of the advertising. The second method for marketing Internet advertising may further include collecting additional transaction data for the Internet advertising directed to the future website visitors and generating improved statistical mappings based on the additional transaction data.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
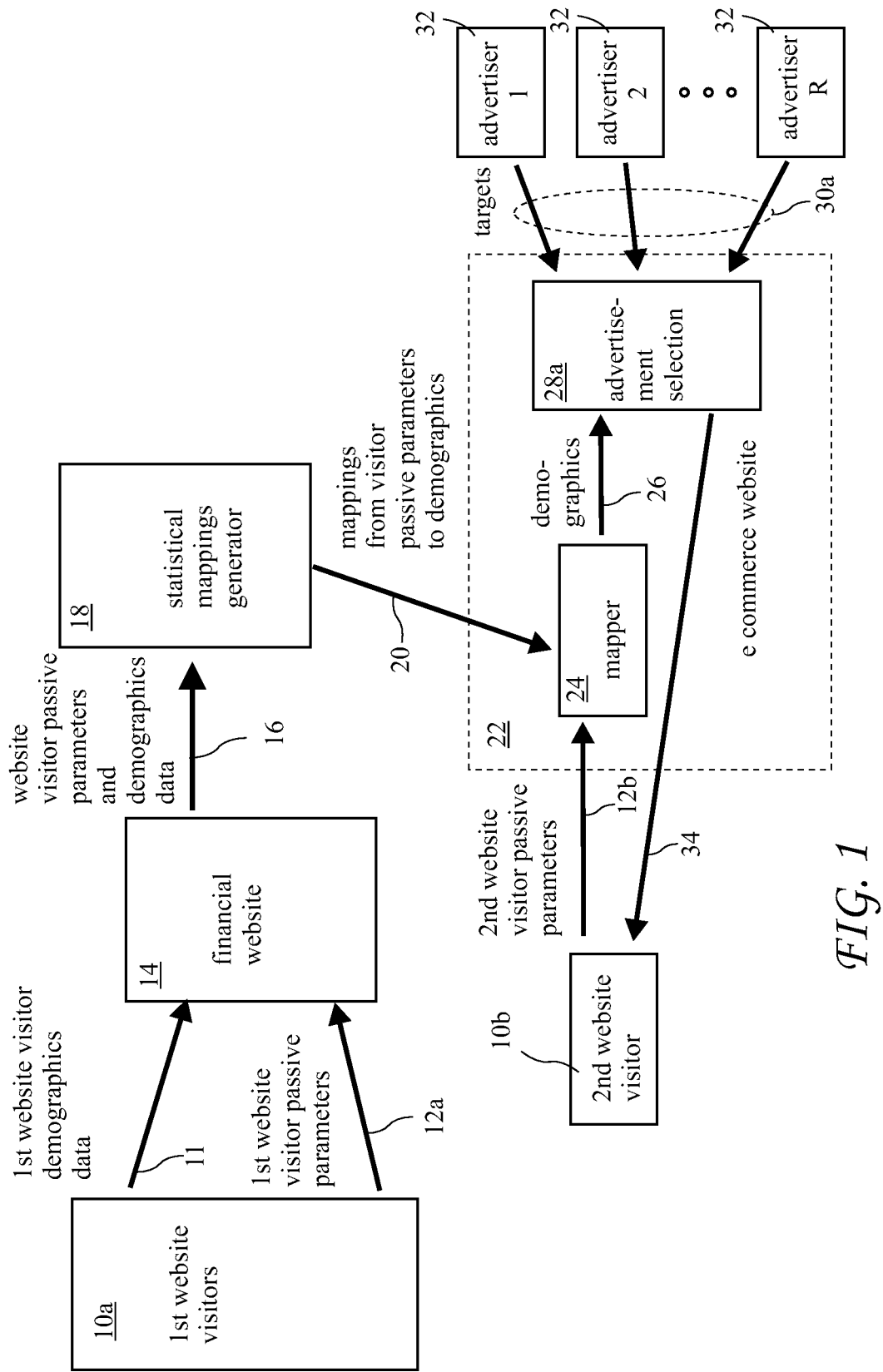
FIG. 1 is a diagram of generation and application of a mapping between passive website visitor parameters and demographics according to the present invention.

A general diagram of a method for improving targeting of Internet advertising according to the present invention is shown in FIG. 1. The diagram includes a first phase for generating mappings 20 between website visitor passive parameters and demographics, and a second phase of applying the mappings 20 to individual website visitor passive parameters to obtain demographics and basing Internet advertising on the demographics. In general, parameters available whenever a website is visited are referred to herein as passive parameters and are described in more detail below. The passive parameters are anonymous and do not identify an individual website visitor. The passive visitor parameters may include data in the browser agent, time of day when visiting websites, IP address, etc. for the website visitors 10*a*. A browser agent is a set of parameters sent to a website by a website visitor visiting the website to help the website determine how to format content to send to the visitor. Such passive parameters are generally passively available when any visitor merely visits a website, that is, available without requesting information from the visitor and without attempting to interrogate the visitors computer.

Other parameters, referred to herein as active parameters, are available at some websites, for example, demographics information at financial websites or transaction information available at e-commerce websites, are more personal, but may be obtained with corresponding passive parameters without compromising a web site visitor's privacy. The active parameters are generally directly related to behaviors or other attributes which may be estimated using mappings from the passive parameters.

In the first phase, passive parameters 12*a* and corresponding demographics 11 are received by a financial website 14 from first website visitors 10*a*. The financial information includes the financial and other data used by the financial website 14 in its normal course of operation. Such information may include age, gender, education, address, income, etc. of each website visitor 10*a*. The use of this data by the present invention does not require identifying individual website visitors, specifically, privacy is maintained. The combined passive parameters and demographics data 16 is processed by a statistical mapping generator 18 (described in more detail below) to generate the statistical mappings 20 from the passive parameters to visitor demographics.

Continuing with FIG. 1, in the second phase, the statistical mappings 20 are applied by a mapper 24 to individual second visitor passive parameters 12b (which do not include personal or financial information) received by an e-commerce website 22 from second website visitors 10b to generate estimated demographics 26. The individual demographics 26 and advertising demographic targets 30a from advertisers 32 are compared in advertisement selection 28a to select Internet advertising 34 provided to the website visitor 10b. The selection of advertising may include both the objects advertised and the manner of presenting the advertisements to the website visitor 10b. The selection may also be the result of bidding by the advertisers 32, where the bids are to some extent based on the estimated demographics 26. Further, the demographics mappings 20 may be provided to the advertisers 32, and the advertisers 32 may form advertising targeting strategy and negotiate with the e-commerce website 22 on advertising rates based on the visitor parameters 12b. Several advertisers 32 may provide overlapping targets 30a, and the advertisement selection 28a may select to provide advertising 34 having the highest profit, increased user registration, or any result providing value to the advertiser or web site operator.

Figure 2:
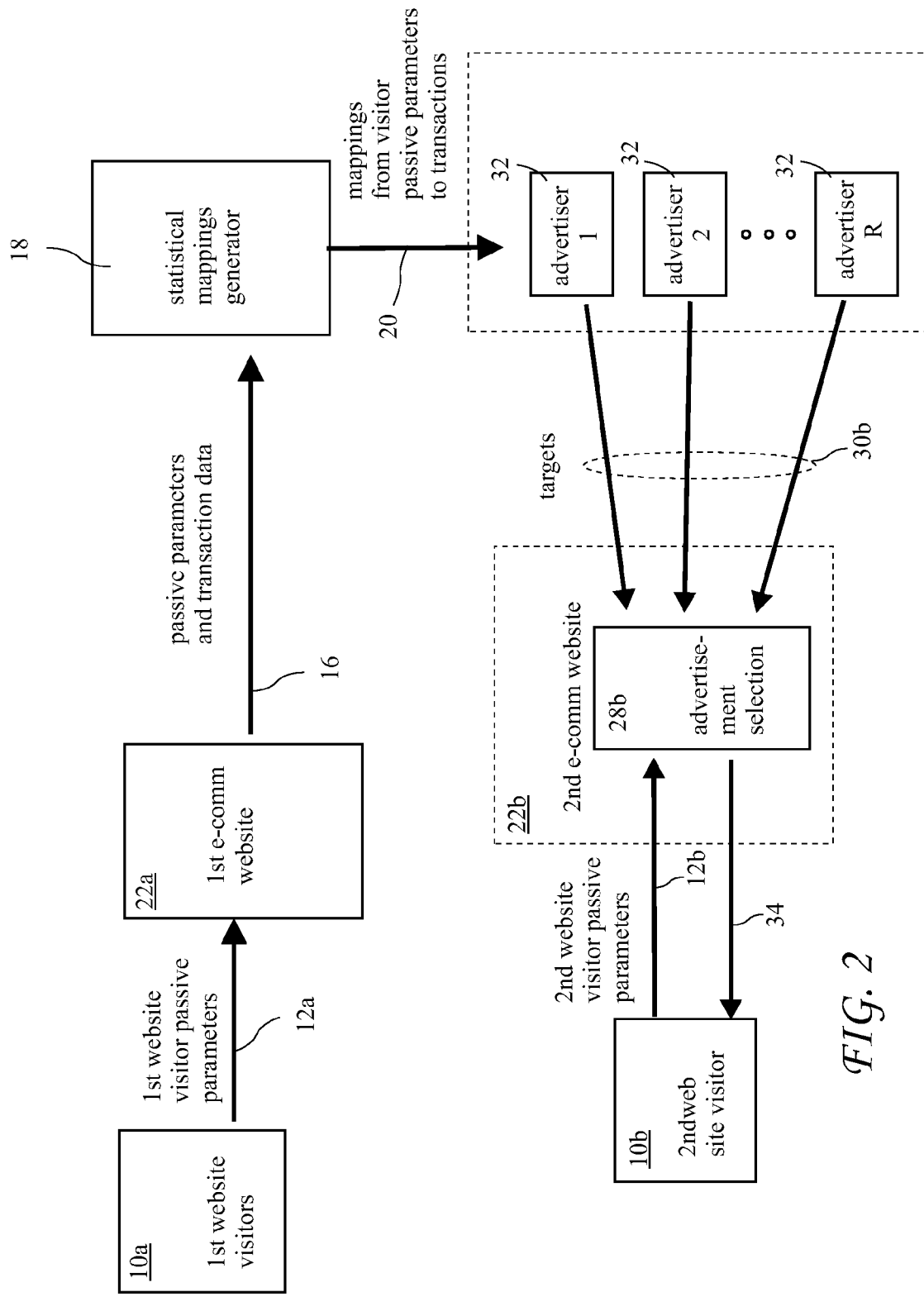
FIG. 2 is a diagram of a second embodiment of generation and application of a mapping between passive website visitor parameters and demographics according to the present invention.

A diagram of a second embodiment of generation and application of a mapping between passive website visitor parameters and active parameters according to the present invention is shown in FIG. 2. The second embodiment provides the same passive parameters 12a from first website visitors 10a to an e-commerce website 22a, but does not rely on demographic information provided by the website visitors 10a. The active parameters are transaction data from actual transactions on the e-commerce website 22a. The combined passive parameters and transaction data 16 is provided to the statistical mapping generator 16 to generate statistical mappings 20.

In the second phase, the statistical mappings 20 are provided to the advertisers 32, and the advertisers 32 provide second targets 30b which describe the passive visitor parameters 12b the advertisers desire to target advertising to. The e-commerce website 22b then compares the passive visitor parameters 12b to the targets 30b in a second advertisement selection 28b to determine advertising 34 provided to the website visitor 10b. Several advertisers 32 may provide overlapping targets 30b, and the advertisement selection 28b may select to provide advertising 34 having the greatest value.

Figure 3:
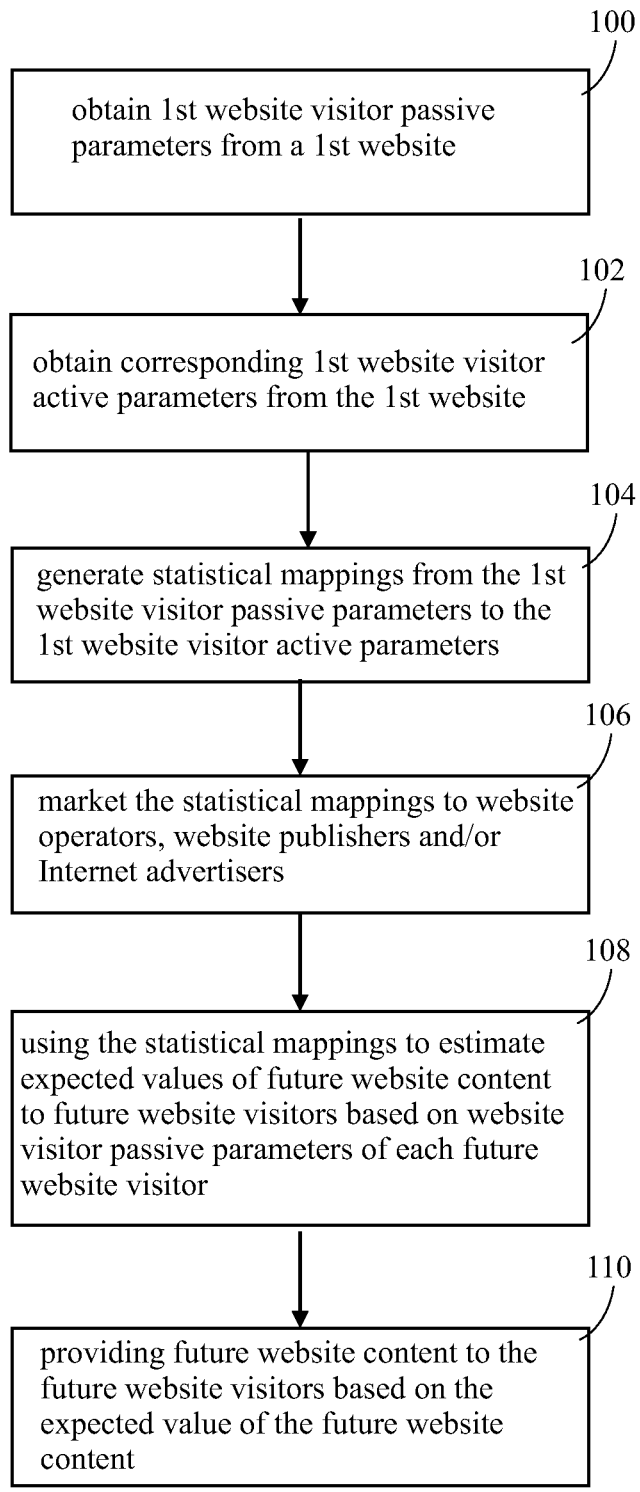
FIG. 3 describes a first method according to the present invention.

A method for selecting website content according to the present invention is described in FIG. 3. The method for selecting website content includes obtaining a multiplicity of anonymous first website visitor passive parameters from a first website for a multiplicity of first website visitors visiting the first website, where the anonymous first website visitor passive parameters are commonly available whenever a website is visited at step 100, obtaining corresponding first website visitor active parameters of the first website visitors from the first website, where the website visitor active parameters are correlatable to a value of website content presentable to future website visitors, at step 102, generating anonymous statistical mappings between the first website visitor passive parameters of the first website visitors and the corresponding first website visitor active parameters of the first website visitors, where the statistical mappings do not rely on any data identifying an individual website visitor, at step 104, marketing the statistical mappings to one of website operators, website publishers, and/or Internet advertisers at step 106, using the statistical mappings to establish an expected value of future website content provided to the future website visitors, based on future website visitor passive parameters of each of the future website visitors, at step 108, and providing future website content to the future website visitors based on the expected value of the future website content at step 110.

Figure 4:
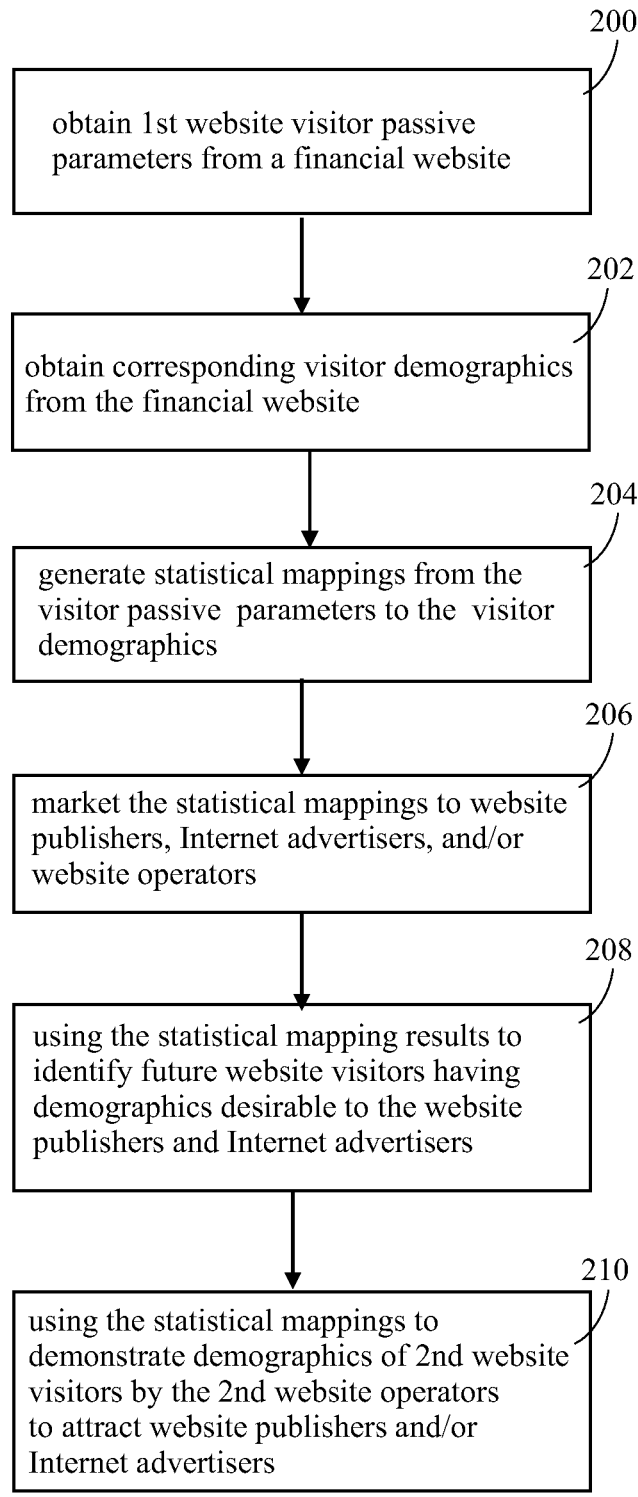
FIG. 4 describes a second method according to the present invention

A method for budgeting advertising to visitors based on the expected values of the advertising according to the present invention is described in FIG. 4. The method for budgeting advertising to visitors based on the expected values of the advertising includes obtaining a multiplicity of anonymous first website visitor passive parameters from a financial website for a multiplicity of financial website visitors visiting the financial website, where the anonymous first website visitor passive parameters are commonly available whenever a website is visited, at step 200, obtaining corresponding financial website visitor demographics of the financial website visitors, where a value of website content presentable to future website visitors is correlatable to the financial website visitor demographics, at step 202, anonymously generating statistical mappings between the first website visitor passive parameters and the financial website visitor demographics of the financial website visitors, where the statistical mappings do not rely on any data identifying an individual website visitor, at step 204, marketing the statistical mappings to at least one of website publishers, Internet advertisers, and/or second website operators at step 206, using the statistical mappings to either identify future website visitors having demographics desirable to the website publishers and Internet advertisers at step 208, and/or demonstrating demographics of the second website visitors visiting second websites by the second website operators to attract website publishers and/or Internet advertisers at step 210.

Figure 5:
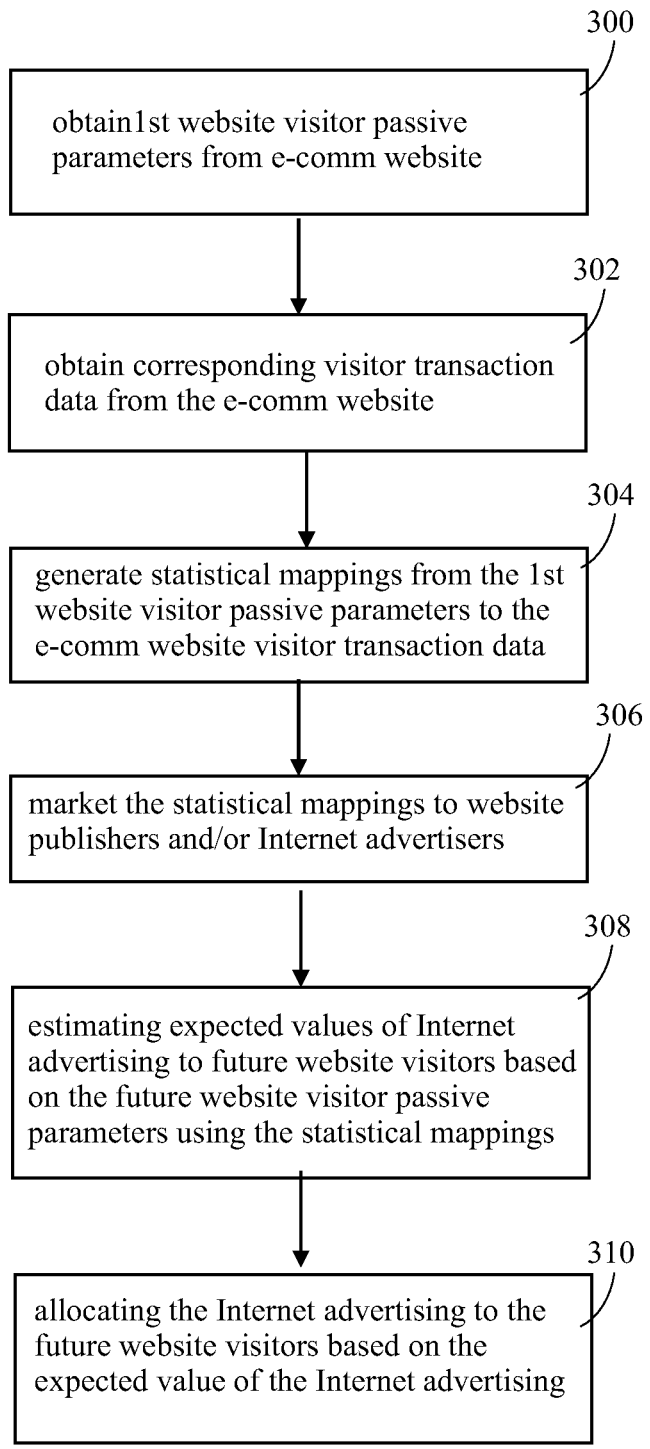
FIG. 5 describes a third method according to the present invention.

A second method for marketing Internet advertising according to the present invention is described in FIG. 5. The method for marketing Internet advertising includes obtaining anonymous first website visitor passive parameters from an e-commerce website for a multiplicity of e-commerce website visitors visiting the e-commerce website, where the anonymous first website visitor passive parameters are commonly available whenever a website is visited, at step 300, obtaining transaction data from the e-commerce website corresponding to the first website visitor passive parameters for the e-commerce website visitors at step 302, generating statistical mappings from the first website visitor passive parameters to the transaction data, where the statistical mappings do not rely on any data identifying an individual website visitor, at step 304, marketing the statistical mappings to website publishers and Internet advertisers at step 306, estimating expected values of Internet advertising to future website visitors based on future website visitor passive parameters of the future website visitors and the statistical mappings at step 308, and allocating the Internet advertising to the future website visitors based on the expected values of the advertising at step 310.

Figure 6:
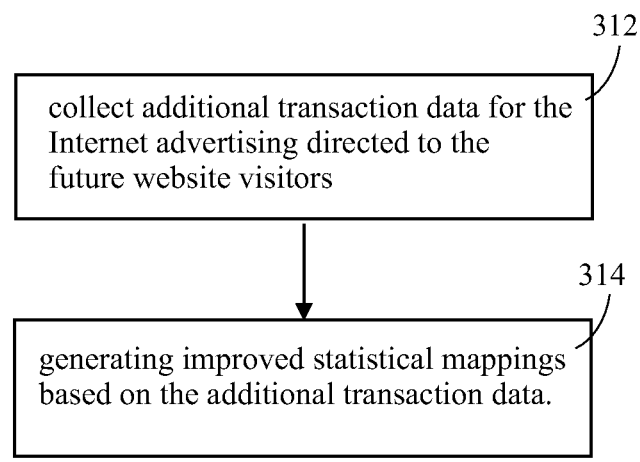
FIG. 6 describes optional additional steps in the third method according to the present invention.

The method for marketing Internet advertising may further include improving the statistical mapping as shown in FIG. 6. The additional steps include collecting additional transaction data for the Internet advertising directed to the future website visitors at step 312 and generating improved statistical mappings based on the additional transaction data at step 314.

As an example of the application of the present invention, an Internet Search Engine (ISE) sends a large number of search engine visitors to an e-commerce website. The e-commerce website compares the value of the ISE visitors to the e-commerce website to the visitor's passive parameters to obtain a statistical mapping. The e-commerce website shares the statistical mapping with the ISE. The ISE then is more aggressive in displaying the e-commerce website ads to ISE visitors of high value to the e-commerce website and is less aggressive, or stops entirely, displaying ads to search engine visitors of low value to the e-commerce website. The ISE and the e-commerce website also adjust the pricing of clicks and referrals based on the available parameters.

Several methods for generating the statistical mappings are available. A direct mapping method uses a regression or other statistical techniques to estimate the likelihood that the website visitor has a specific characteristic, based on their browser agent. First, a large database of records which include website visitor active parameters (e.g., financial or personal information) from a website and corresponding website visitor passive parameter (e.g., browser agents) is collected, and a regression or other statistical techniques is used to estimate the likelihood that the website visitor has a specific demographic characteristic, based on their browser agent. The financial and personal information and matching browser agent may be collected from, for example, demographic information collected by a credit bureau. Some websites have usable logs which may be correlated to the financial and personal information. For example, virtually all web logs track browser agent and may also note the username. A record of the web browser agent and the specific website information (in the example, the consumer demographic information, but not their name, Social security number, nor other unique identifiers) is collected. When a large number of records have been collected, statistical techniques are employed, to match the browser agent to a demographic profile. For each user agent, a profile (for example, 60% male, 40% female; 20% over 50 years old, 30% are 30-49 years old, 30% are 21-29 years old, 20% under 21 years old; 40% over $100 k income, etc.) is developed. Although a single visit at a website by a browser does not yield statistically useful information, a sufficient number of visits creates a statistically significant demographic profile.

Another method for generating statistical mappings is Multi-Factor Mapping. In some instances, a website, might want to change its offering to a visitor based on combinations of several factors. For example, a web retailer may use web browser agents to define customer segments and tailor the advertising to the browser agent. As in the Direct Mapping example above, statistically meaningful visitor information required to generate mappings from the browser agent to visitor characteristics is obtained. A retailer may desire to split their visitors into four segments: information hungry consumers that want lots of data before they buy; men that are active purchasers on the web; women that are active purchasers on the web; and others. Visitor browser information may be collected from an advice site (for example, CNET) and define certain browser agents which correlate with visitors seeking an information intensive web experience. For visitors not in the information intensive segment, information on demographics (e.g., from a credit bureau) and on tendency to purchase online (e.g., from e-commerce websites) may be combined to identify browser agents which correlate with gender, incomes, or other demographic data. Browser agents which do not correlate with any of the above groups may be correlated with, for example, branding or other useful discriminates.

Further, the mappings may be continuously updated. Preferably, an advertiser works with a search engine or publisher to increase the value of their business relationship by continuously updating mappings specific to the advertiser/publisher combination. The advertiser may monitor its own transactions and places a value on new transactions for each browser agent. The advertiser may place clickable ads on the publishers website. The publisher only displays the ads to consumers with browser agents selected by the publisher. The advertiser may also pay differing rates for clicks based on the browser agent. As visitors click-through to the advertisers site, the advertiser adjusts the value of a single visitor with each browser agent. Depending on the contractual relationship, the advertiser either passes this information back to the publisher or simply adjusts the rates the advertiser offers to pay for traffic based on the browser agent and the source (i.e., the publisher). Over time, the advertiser may assign different values for a particular browser agent for each publisher. In other words, each combination of a browser agent and publisher will have an estimated value (e.g., gross profit.)

There may be some browser agents which are very uncommon or are uncommon on a specific site. As a result, it may be difficult to assign, with any statistical confidence, any characteristics (e.g., demographics) to the browser agent. As an alternative to the Direct Mapping described above, all of the data collected, including data from other websites, may be used to find a more common browser agent that has similar characteristics to the uncommon agent. For example, in order to estimate demographic data for a website, rather than ignore an uncommon browser agent, use statistical techniques to assign characteristics to the browser agent. It may be determined that on other sites, a complicated and unusual browser agent, such as: Mozilla/4.0 (compatible; MSIE 7.0; Windows NT 5.1; InfoPath.1)libwww-perl/5.808 has similar characteristics to a simpler agent, such as: AMozilla/4.0 (compatible; MSIE 7.0; Windows NT 5.1). The latter browser agents demographics may then be assigned to the unusual browser agent.

In some instances, the browser agent will not be able to distinguish unusual results. For example, if a website has nearly 100% men (for example, Slashdot), almost all browser agents will map into demographic profiles which, using direct mapping, will show a more balanced percentage of men. This problem may be addressed by doing a second-order analysis of the browser agents. An agreement may be made with a website assumed to have an unusual demographic profile (for example, almost all men, women, young people, etc.). Their data may be collected and mappings generated using methods similar to the direct mapping example. A profile of which browser agents are present may be generated and which are absent in websites with extreme profiles. Statistical techniques may then be employed to match the distribution of browser agents to an extreme profile. In addition to the results of the direct mapping, the estimates may be adjusted based on the distribution of browser agents.

While the invention herein disclosed has been described by means of specific embodiments and applications thereof, numerous modifications and variations could be made thereto by those skilled in the art without departing from the scope of the invention set forth in the claims.

We claim:

1. A computer implemented method for selecting website content, the method comprising:
   a first step of generating anonymous statistical mappings between website visitor passive parameters and the website visitor characteristics, the first step comprising:
      obtaining a multiplicity of anonymous website visitor passive parameters for a multiplicity of website visitors, wherein the anonymous website visitor passive parameters are commonly available whenever a website is visited, wherein the passive parameters are parameters available without requesting information from the visitor and without interrogating a computer being used by the visitor to access the website; and
      generating the anonymous statistical mappings using direct mapping method to estimate likelihoods that the website visitor has specific website visitor characteristics based on the website visitor passive parameters;

a second step of determining a mapping between the website visitor passive parameters and the website visitor demographics profiles, the second step comprising:
defining a set of the demographics profiles;
identifying the website visitor characteristics of each demographics profiles; and
developing mappings between the website visitor passive parameters and the website visitor demographics profiles based on the anonymous statistical mappings from the website visitor passive parameters to the website visitor characteristics and the website visitor characteristics of each demographics profiles;

marketing the mappings between the website visitor passive parameters and the website visitor demographics profiles to website operators;

the website operators determining future website content having the greatest expected value for each demographic profiles using the mappings; and the website operators selecting content to provide to future visitors based on the expected value of the future website content; and providing the selected content over the Internet using computers connected to the Internet.

2. The method of claim 1, wherein the website visitor passive parameters are selected from data in a browser agent, time of day when visiting websites, and IP address for the website visitors.

3. The method of claim 1, wherein generating anonymous statistical mappings using direct mapping method includes statistical techniques to estimate the likelihood that the website visitor has a specific characteristic to generate the anonymous statistical mappings.

4. The method of claim 1, wherein generating anonymous statistical mappings using direct mapping method comprises using Multi-Factor Mapping to estimate the likelihood that the website visitor has a specific characteristic to generate the anonymous statistical mappings.

5. The method of claim 2, wherein the browser agent data comprises a set of parameters sent to a website by the website visitor visiting the website to help the website determine how to format content to send to the website visitor, such passive parameters passively available when the website visitor visits the website without the website requesting information from the website visitor and without attempting to interrogate the website visitors computer.

6. The method of claim 1, wherein obtaining the multiplicity of anonymous website visitor passive parameters consists of obtaining records solely from server log files.

\* \* \* \* \*